US011645468B2

(12) United States Patent
Xu et al.

(10) Patent No.: US 11,645,468 B2
(45) Date of Patent: May 9, 2023

(54) USER DATA PROCESSING

(71) Applicant: Amazon Technologies, Inc., Seattle, WA (US)

(72) Inventors: Yi Xu, Bothell, WA (US); Abhinav Aggarwal, Seattle, WA (US); Anand Victor, Bellevue, WA (US); Rahul Gupta, Waltham, MA (US); Han Zeng, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 17/009,026

(22) Filed: Sep. 1, 2020

(65) Prior Publication Data

US 2022/0067289 A1 Mar. 3, 2022

(51) Int. Cl.
*G06F 17/00* (2019.01)
*G06F 40/295* (2020.01)
*G06F 40/30* (2020.01)
*G10L 15/08* (2006.01)

(52) U.S. Cl.
CPC .......... *G06F 40/295* (2020.01); *G06F 40/30* (2020.01); *G10L 15/08* (2013.01)

(58) Field of Classification Search
None
See application file for complete search history.

(56) References Cited

U.S. PATENT DOCUMENTS

| | | | |
|---|---|---|---|
| 10,332,517 B1* | 6/2019 | Wang | G06F 21/32 |
| 10,567,515 B1* | 2/2020 | Bao | G10L 17/22 |
| 11,081,104 B1* | 8/2021 | Su | G06F 40/216 |
| 11,127,395 B1* | 9/2021 | Borja Jaramillo | G06F 40/295 |
| 2020/0184959 A1* | 6/2020 | Yasa | G10L 15/1815 |

OTHER PUBLICATIONS

International Search Report and Written Opinion dated Dec. 1, 2021 for International Patent Application No. PCT/US2021/048016.
Braghin Stefano, et al: "An Extensible De-Identification Framework for Privacy Protection of Unstructured Health Information: Creating Sustainable Privacy Infrastructures", Studies in health technology and informatics, Aug. 21, 2019 (Aug. 21, 2019), pp. 1140-1144, XP055864188, DOI: 10.3233/SHTI190404, https://pubmed.ncbi.nlm.nih.gov/31438103/ [retrieved on Nov. 22, 2021] abstract section Methods, pp. 1141-1143; figure 2.
Danushka Bollegala, et al: "Anonymising Queries by Semantic Decomposition", arxiv.org, Cornell University Library, Sep. 12, 2019 (Sep. 12, 2019), XP081482400, abstract.

(Continued)

*Primary Examiner* — Satwant K Singh
(74) *Attorney, Agent, or Firm* — Pierce Atwood LLP

(57) ABSTRACT

Techniques for determining attributable data in a natural language user input that can be used to identify a specific user are described. A system may use various data signals determined using different components. The system may process the various signals to make a final determination on whether the input includes attributable data. The system may use a first component to detect user-identifiable data in the input. The system may use a second component to determine whether the input is potentially attributable to a particular user.

18 Claims, 9 Drawing Sheets

(56) References Cited

OTHER PUBLICATIONS

Rakshith Shetty, et al.: "AA4NT: Author Attribute Anonymity by Adversarial Training of Neural Machine Translation", arxiv.org, Cornell University Library, Nov. 6, 2017 (Nov. 6, 2017), XP081285526, abstract.

Tesfay Welderufael B., et al.: "PrivacyBot: Detecting Privacy Sensitive Information in Unstructured Texts", 2019 Sixth International Conference on Social Networks Analysis, Management and Security (SNAMS), IEEE, Oct. 22, 2019 (Oct. 22, 2019), pp. 53-60, XP033673889, DOI: 10.1109/SNAMS.2019.8931855 [retrieved on Dec. 12, 2019] abstract.

International Preliminary Report on Patentability dated Mar. 7, 2023 for International Patent Application No. PCT/US2021/048016.

\* cited by examiner

USER DATA PROCESSING

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
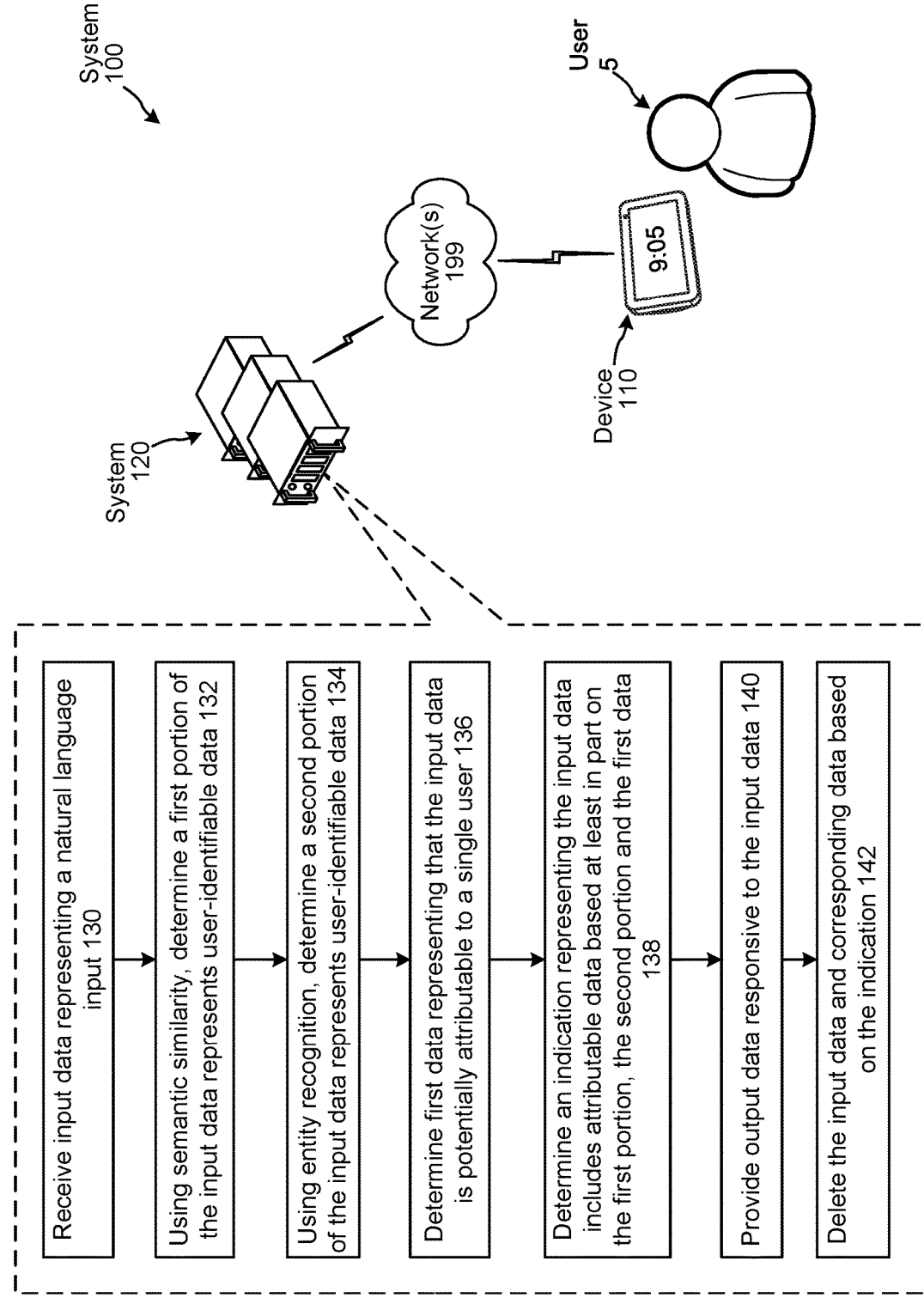
FIG. 1 is a conceptual diagram illustrating a system configured to process a natural language user input to determine it includes sensitive data, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language user inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may be configured to generate outputs in response to natural language user inputs (e.g., spoken and/or text-based natural language user inputs). For example, for the natural language user input "play workout music," a system may output music from a user's workout playlist. For further example, for the natural language user input "book a taxi for my address <street address, city, state>," a system may cause an application to book a taxi for the provided address. In another example, for the natural language user input "refill my prescription number <number>," a system may cause an application to refill the indicated prescription number.

As illustrated in the above examples, a system may receive a natural language user input that includes information that can be used to identify a particular user (referred to herein as "user-identifiable data). User-identifiable data may include personal information (PI), personally identifiable information (PII), confidential information, health/medical related information, and/or other information particularly related to a user.

In some cases, a user input (or portions of a user input) may be unique in a way that the user input (along with some other available information) can be used to identify the user that provided the user input. For example, a user input relating to a purchase of a rare item on a particular day can be attributed to a particular user because not many users purchase or own the rare item.

The system of the present disclosure may be configured to identify natural language user inputs that are attributable to the particular user that provided it, and may flag such inputs so that data related to such inputs can be discarded once processing is completed. The present disclosure describes a system that, among other things, may detect user-identifiable data in a natural language user input based on data determined by various components. In some embodiments, the system may include multiple components configured to determine whether a user input includes user-identifiable data, as well as what portions of the user input represent user-identifiable data. These components may detect user-identifiable data using different techniques, thus, generating different results, at least in some cases. For example, one component may use semantic similarity techniques, and determine that one or more words in the natural language user input are semantically similar to words that convey user-identifiable information. Another component, for example, may use entity recognition techniques, and determine that a particular entity type, corresponding to user-identifiable information, is represented in the natural language user input. Another component may use expression matching to identify portions of the natural language user input that represent user-identifiable information. In yet another component, a machine learning model may process the natural language user input to identify portions of the input that represent user-identifiable information.

The system may also include multiple components configured to determine if the natural language user input is potentially attributable to a particular user using the content of the natural language user input. For example, a natural language user input that is provided by multiple users to the system may not be attributable to one particular user. The system may use the results generated by the different foregoing components (that detect user-identifiable data in the input and determine whether the input is potentially-attributable) to make a final determination with respect to the user input including attributable data. The system may flag a natural language user input as including attributable data. After the system generates or determines an output responsive to the natural language user input, the system may delete data corresponding to the natural language user input.

The system of the present disclosure, in some embodiments, may identify the natural language user input as including user-identifiable data after the system performs ASR processing but prior to performing NLU processing. If the natural language user input is flagged as including attributable data, the downstream components may handle processing of the input in an appropriate manner.

Aspects of the present disclosure improve the user experience. Moreover, teachings of the present disclosure relate to improved computing techniques for detecting user attributable data in natural language user inputs.

FIG. 1 illustrates a system 100 configured to process a natural language user input to determine it includes attributable data. Although the figures and discussion of the present disclosure illustrate certain steps in a particular order, the steps described may be performed in a different order (as well as certain steps removed or added) without departing from the present disclosure. As shown in FIG. 1, the system 100 may include a device 110 (local to a user 5) in communication with a system 120 across one or more networks 199. The network(s) 199 may include a local or private network, or may include a wide network such as the Internet.

The system 120 receives (130) input data representing a natural language user input. For example, the device 110 may receive audio corresponding to a spoken natural language user input from the user 5. The device 110 may generate audio data representing the audio, and may send the audio data to the system 120. For further example, the device 110 may receive a text-based (e.g., typed) natural language user input from the user 5. The device 110 may generate text data representing the text-based natural language user input, and may send the text data to the system 120. In another example, the device 110 may include (or otherwise be associated with) a camera that captures a sequence of images representing the user 5 performing a gesture. The device 110 may send image data (representing the sequence of images) and/or an indication of the gesture performed to the system 120, and the system 120 may determine the gesture corresponds to a particular natural language user input. In a further example, the device 110 may include (or otherwise be associated with) a motion sensor configured to detect motion. When the device 110 detects motion, the device 110 may send data representing the detected motion to the system 120, and the system 120 may determine the detected motion corresponds to a particular natural language user input. In another example, the device 110 may include a button or display a virtual button, and the device 110 may detect the user 5 interacting with the button. The user 5 may interact with the button in various manners, such as a single quick press, a single long press, a double tap, a roaming touch input in a particular direction, etc. The device 110 may send data representing the detected button interaction to the system 120, and the system 120 may determine the button interaction corresponds to a particular natural language user input. The input data (as received by the system 120) may be ASR output data (corresponding to a spoken natural language user input), text data (corresponding to a text-based natural language user input, a gesture-based natural language user input, a motion-based natural language user input, a button selection-based natural language user input, etc.), or some other data representation of a natural language user input.

The system 120, using semantic similarity processing, may determine (132) that a first portion of the input data represents user-identifiable data. For example, the system 120 may store data including words that represent user-identifiable data (e.g., "prescription," "username," "password", etc.). To determine the first portion represents user-identifiable data, the system 120 may determine the first portion (of the input data) corresponds to the stored data (i.e., corresponds to one or more words corresponding to user-identifiable information in the stored data). In at least some embodiments, the system 120 may determine a semantic textual similarity between text (in the input data) and text data corresponding to user-identifiable information in the stored data. Sematic textual similarity refers to determining how similar two text strings are.

In addition to or instead of determining the first portion of the input data represents user-identifiable data (based on semantic similarity), the system 120 may use entity recognition processing to determine (134) that a second portion of the input data represents user-identifiable data. For example, the system 120 may store entity data indicating entity types that correspond to user-identifiable data (e.g., address/location, first and last name, etc.). To determine the second portion corresponds to user-identifiable data, the system 120 may determine the second portion corresponds to the stored data (i.e., corresponds to one or more entity types in the stored entity data).

The system 120 determines (136) first data representing the input data is potentially attributable to a single user, for example, the user 5. For example, the system 120 may determine, in stored data representing past natural language user inputs received by the system 120, a past natural language user input matching (or being semantically similar to) the natural language user input represented in the input data. The system 120 may determine a number of times the past natural language user input was received by the system 120. The system 120 may also determine how many different users provided the past natural language user input. Based on the number of times the past input was received and the number of different users that provided the past input, the system 120 may determine that the input data is potentially attributable to a single user (and cannot be attributed to different users). In other words, it is likely that the user 5 can be identified using the substance of the input data because the user input is unique/uncommon. In at least some embodiments, the system 120 may determine the input data is potentially attributable to the user 5 if the number of times, the past natural language user input was received, fails to satisfy a condition (such as a threshold number of times) and/or the number of different users, that provided the past natural language user input, fails to satisfy a condition (such a threshold number of users).

In determining if the input data is potentially attributable to the user 5, the system 120 may also determine if portions of the input data representing user-identifiable data can be replaced with non-identifiable data. For example, the system 120 may store non-identifiable data representing words corresponding to non-identifiable information. The system 120 may determine whether there are words (in the non-identifiable data) that are semantically similar to the first portion and/or the second portion of the input data. The system 120, in some embodiments, may determine an alternative representation of the user input by replacing the first portion and/or second portion (representing user-identifiable data) with words that are semantically similar and represent non-identifiable data. In some embodiments, if all the portions representing user-identifiable data in the natural language user input can be replaced with words representing non-identifiable data, then the system 120, as the final determination (in step 138), may generate an indication that the natural language user input does not attributable data. In some embodiments, the alternative representation of the user input may be provided to downstream components for further processing.

The system 120 determines (138) an indication that the input data includes attributable data. The system 120 may determine the indication based on the first portion representing user-identifiable data (as determined in step 132), the second portion representing user-identifiable data (as determined in step 134), the input data being determined to be attributable to the single user 5 (as determined in step 136), and/or the system 120 being unable to determine one or more words (in the non-identifiable data) that are semantically similar to the first portion and the second portion of the input data. In some embodiments, the system 120 may determine the input data includes attributable data using various techniques to process the data determined in steps 132, 134 and 136, for example, to aggregate or otherwise combine the data determined in steps 132, 134, and 136.

After performing, or at least partially in parallel to performing steps 132-138, the system 120 may process the input data to determine (140) output data responsive to the input data. For example, if the input data is ASR output data or text data, the system 120 may process (as described herein below) the ASR output data or text data using NLU processing to generate NLU output data, and the NLU output data may be processed by a skill (e.g., a skill component 290, a skill system 125, or a combination of a skill component 290 and skill system 125) to determine the output data. After the output data is determined, the system 120 deletes (144) the input data, and any data corresponding to or representing the input data, based on the indication representing that the input data includes user-identifiable data. For example, the system 120 may delete ASR output data corresponding to natural language user input, NLU data (e.g., NLU hypothesis, intent, domain, entity values, etc.) corresponding to the natural language user input, application data representing one or more applications (e.g., skills 290) that were invoked to generate an output responsive to the natural language user input.

In some embodiments, the system 120 may delete data before the output data is determined by the system 120. For example, the system 120 may delete the ASR output data once the ASR output data is communicated to other components, such as the NLU component 260.

Thus the system 120 may use multiple techniques (e.g., semantic similarity processing and entity recognition processing) to determine a single natural language user input includes user-identifiable data, determine that the natural language user input is potentially attributable to a single user, and, then make a final determination thereon that the natural language user input includes attributable data, and based thereon, the system 120 may delete the input data once the system provides a responsive output to the user 5. In other cases, if the system 120 determines that portions of a natural language user input represent user-identifiable data (using semantic similarity or entity recognition), but that the natural language user input can be attributed to multiple users (based on a number of past inputs received by the system), then the system 120 may determine an indication representing the natural language user input does not include attributable data (or an indication representing the natural language user input includes non-attributable data only). Based on this indication, the system 120 may not delete data representing or corresponding to the natural language user input after providing a responsive output.

In other cases, if the system 120 determines that portions of a natural language user input represent user-identifiable data (e.g., using semantic similarity or entity recognition), but that these portions can be replaced using semantically similar non-identifiable data, then the system 120 may determine an indication representing the natural language user input does not include attributable data (or an indication representing the natural language user input includes non-attributable data only). Based on this indication, the system 120 may not delete data representing or corresponding to the natural language user input after providing a responsive output.

Figure 2:
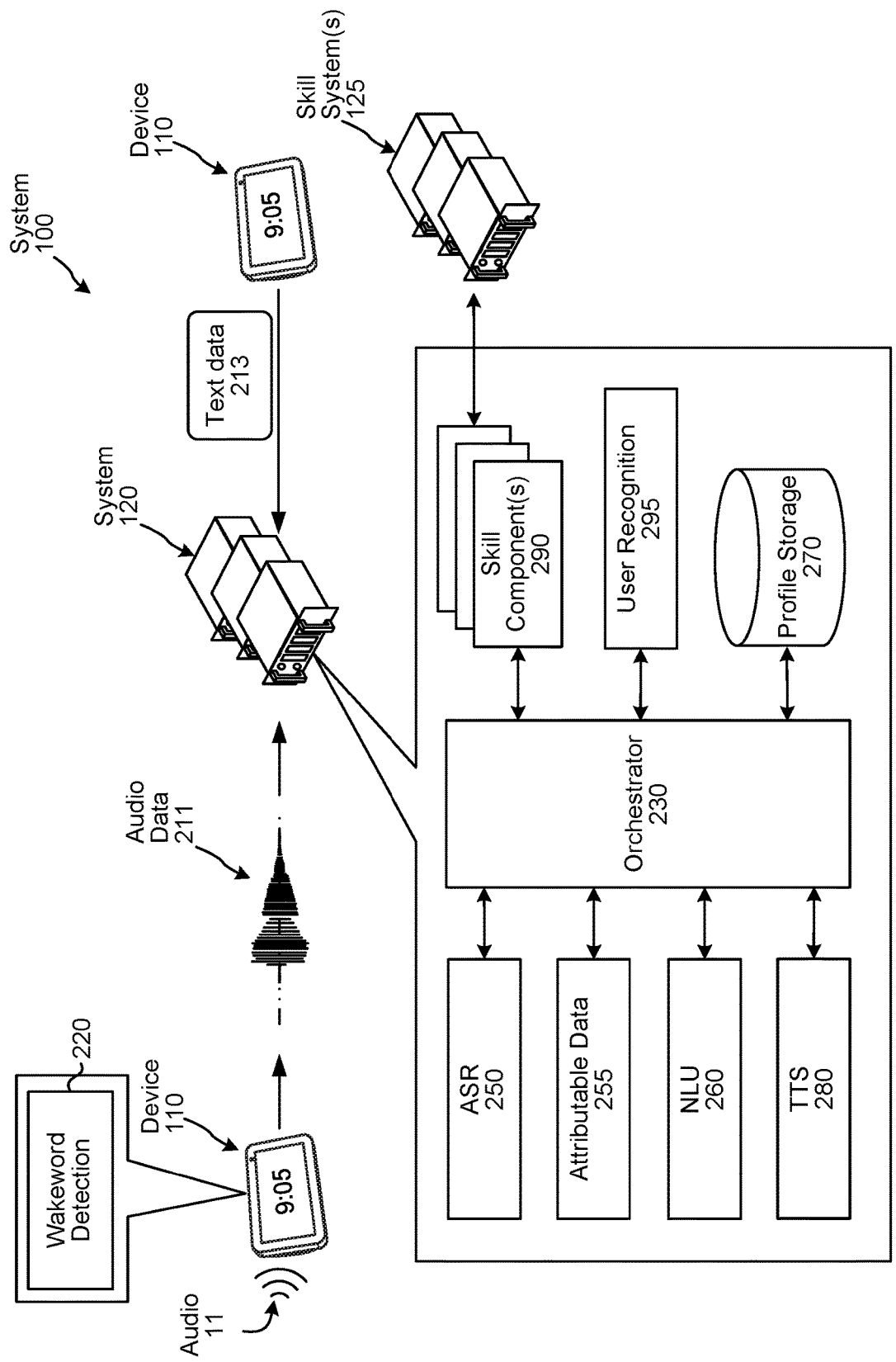
FIG. 2 is a conceptual diagram of components of a system, according to embodiments of the present disclosure.

The system 100 may operate using various components as illustrated in FIG. 2. The various components may be located on a same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented using techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once the device 110 detects speech in audio data representing the audio 11, the device 110 may use a wakeword detection component 220 to perform to determine when the user 5 intends to speak an input to the device 110. The device 110 may be configured to detect various wakewords. In at least some examples, each wakeword may correspond to a different digital assistant. In at least some examples, a wakeword may correspond to a name of a digital assistant. Example wakewords include, but are not limited to, Alexa, echo, Amazon, and computer.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the remote system 120. The audio data 211 may include data corresponding to the detected wakeword, or the device 110a may remove the portion of the audio corresponding to the detected wakeword prior to sending the audio data 211 to the remote system 120.

The system 120 may include an orchestrator component 230 configured to receive the audio data 211 from the device 110. The remote system 120 may include a language processing component 240 configured to perform language processing. As used herein, language processing may refer to NLU processing, or a combination of ASR processing and NLU processing.

The orchestrator component 230 may send the audio data 211 to an ASR component 250 that transcribes the audio data 211 into ASR output data including one or more ASR hypotheses. ASR output data may include one or more textual interpretations (corresponding to one or more ASR hypotheses), or may be configured in another manner, such as a token. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The system 120 may also include an attributable data component 255 that may receive ASR output data (generated by the ASR component 250) via the orchestrator 230 or directly from the ASR component 250. The attributable data component 255, as described in detail below with respect to FIG. 4, may be configured to determine whether a natural language user input includes user-identifiable data. In some embodiments, the attributable data component 255 may process the ASR output data corresponding to a user input provided by the user 5 to determine whether the user input includes user-identifiable data, and which portions of the user input represent user-identifiable data. The attributable data component 255 may generate response data corresponding to the user input, where the response data may include a flag or other type of indicator representing the user input includes user-identifiable data. In some embodiments, the response data may also include a redacted version of the user input in which the user-identifiable data from the user input is redacted or replaced. The response data may also include a user input identifier associated with the user input, which may be used later by the components of the system 120 to delete or perform other processing with respect to the user input. In some embodiments, the system 120 may delete the user input corresponding to the user input identifier and other data corresponding to the user input from any storage that may have stored data corresponding to the user input during SLU (and other) processing of the user input. For example, the NLU component 260 may store data corresponding to the user input, which may be deleted after an output responsive to the user input is provided when the response data indicates that the user input includes user-identifiable data.

The ASR output data (output by the ASR component 250) and the response data (output by the attributable data component 255) may be input to a NLU component 260. The NLU component 260 attempts to make a semantic interpretation of the phrase(s) or statement(s) represented in the ASR output data. That is, the NLU component 260 determines one or more meanings associated with the phrase(s) or statement(s) represented in the ASR output data based on words represented in the ASR output data. The NLU component 260 determines an intent representing an action that a user desires be performed as well as pieces of the spoken input that allow the device 110 (or other device), the remote system 120, a skill system 125, etc. to execute the intent. For example, if the ASR output data corresponds to "play Adele music," the NLU component 260 may determine a <PlayMusic> intent and may identify "Adele" as an artist. For further example, if the ASR output data corresponds to "what is the weather," the NLU component 260 may determine an <OutputWeather> intent. In another example, if the ASR output data corresponds to "turn off the lights," the NLU component 260 may determine a <DeactivateLight> intent. The NLU component 260 may output NLU output data (which may include one or more intent indicators that are each associated with one or more portions of tagged text data).

As described above, the remote system 120 may implement the language processing component 240 as two different components (i.e., the ASR component 250 and the NLU component 260). In at least some embodiments, the language processing component 240 may be implemented as a single component equivalent to a combination of the ASR component 250 and the NLU component 260. In such embodiments, the language processing component 240 may process the audio data 211 and directly generate NLU output data, without an intermediate step of generating ASR output data. As such, the language processing component 240 may take audio data 211 representing speech and attempt to make a semantic interpretation of the speech.

The remote system 120 may include one or more skill components 290. A skill component 290 may be software running on the remote system 120 that is akin to a software application running on a traditional computing device. That is, a skill component 290 may enable the remote system 120 to execute user commands involving specific functionality in order to provide data or produce some other requested output. A skill component 290 may operate in conjunction between the remote system 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components.

A skill component 290 may be configured to execute with respect to NLU output data. For example, for NLU output data including a <GetWeather> intent, the remote system 120 (and more particularly the orchestrator component 230) may invoke a weather skill component to determine and output weather information for a geographic location represented in a user profile or corresponding to a location of the user device 110 that captured the spoken input. For further example, for NLU output data including a <BookRide> intent, the remote system 120 (and more particularly the orchestrator component 230) may invoke a taxi skill component may book a requested ride. In another example, for NLU output data including a <BuyPizza> intent, the remote system 120 (and more particularly the orchestrator component 230) may invoke a restaurant skill component to place an order for a pizza. A skill component 290 may operate in conjunction between the remote system 120 and other devices, such as the device 110, restaurant electronic ordering systems, taxi electronic booking systems, etc. in order to complete certain functions.

A skill component 290 may be associated with a domain, a non-limiting list of which includes a smart home domain, a music domain, a video domain, a weather domain, a communications domain, a flash briefing domain, a shopping domain, and a custom domain.

The functionality described herein as a skill component 290 may be referred to using many different terms, such as an action, bot, app, application, or the like.

In at least some embodiments, a skill component 290 may perform an action by interacting with a skill system 125, which may include one or more databases, other software, and/or the like. For example, a skill component 290 may send an instruction to a skill system 125 to execute specific functionality in order to provide data or perform some other action requested by the user 5. In some examples, a skill component 290 may send a request for data (e.g., request for information) to a skill system 125 and may receive the requested data from the skill system 125, enabling the skill component 290 to perform an action requested by the user 5. In other examples, a skill component 290 may send an instruction to the skill system 125 and the skill system 125 may perform the action requested by the user 5. For example, a weather skill system may enable the system 100 to provide weather information, a car service skill system may enable the system 100 to book a trip with respect to a taxi or ride sharing service, a restaurant skill system may enable the system 100 to order a pizza with respect to the restaurant's online ordering system, etc.

The remote system 120 may communicate with a skill system 125 via Hypertext Transfer Protocol (HTTP) or HTTPS over one or more computer networks such as the network(s) 199, although the disclosure is not limited thereto. Communication between the remote system 120 and a skill system 125 may occur over one or more third-party network; that is, a computer network maintained by a provider not associated with the remote system 120 or the skill system 125 other than by use of the third-party network.

Additionally or alternatively, a skill component 290 may be implemented by a device 110. This may enable the device 110 to execute specific functionality in order to provide data or perform some other action requested by the user 5. The device 110 can host a skill component 290 in the form of an application executing on the device 110. Such a device 110 can be, for example, a mobile device 110 on a mobile network or a local area network (LAN).

The remote system 120, skill system 125, and/or device 110 may each host or otherwise execute instances of same or different skills. In some cases, a single skill—for example, a music skill—may have instances executing on more than one of the remote system 120, skill system 125, and/or device 110. For example, a skill system 125 may host a default instance of a skill while a device 110 hosts a personal instance of the skill. The personal instance of the skill may be a skill instance under development or test on a machine local to and/or operated by a skill developer. In another example, the remote system 120 may host a default instance of a skill while the device 110 hosts a personal instance of the skill in the form of an application executing on the device 110.

The remote system 120 may include a TTS component 280 that generates audio data (e.g., synthesized speech) from text data using one or more different methods. Text data input to the TTS component 280 may come from a skill component 290, a skill system 125, the orchestrator component 230, or another component of the remote system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The remote system 120 may include profile storage 270. The profile storage 270 may include a variety of data related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to spoken inputs corresponding to the profile.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skill components 290/skill systems 125 that the user has enabled. When a user enables a skill component 290/skill system 125, the user is providing the remote system 120 with permission to allow the skill component 290/skill system 125 to execute with respect to the user's spoken inputs. If a user does not enable a skill component 290/skill system 125, the remote system 120 may not invoke the skill component 290/skill system 125 to execute with respect to the user's spoken inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying data (such as input/output capabilities). A device profile may also include one or more user identifiers, corresponding to one or more user profiles associated with the device profile. For example, a household device's profile may include the user identifiers of users of the household.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, retina data, etc.), received by the system 120 in correlation with a natural language user input, to stored biometric data of users. The user recognition component 295 may additionally or alternatively perform user recognition by comparing image data (e.g., including a representation of at least a feature of a user), received by the system 120 in correlation with a natural language user input, with stored image data including representations of features of different users. The user recognition component 295 may perform other or additional user recognition processes, including those known in the art. For a particular natural language user input, the user recognition component 295 may perform processing with respect to stored data of users associated with the device 110 that captured the natural language user input.

The user recognition component 295 determines whether a natural language user input originated from a particular user. For example, the user recognition component 295 may generate a first value representing a likelihood that a natural language user input originated from a first user, a second value representing a likelihood that the natural language user input originated from a second user, etc. The user recognition component 295 may also determine an overall confidence regarding the accuracy of user recognition processing.

The user recognition component 295 may output a single user identifier corresponding to the most likely user that originated the natural language user input. Alternatively, the user recognition component 295 may output multiple user identifiers (e.g., in the form of an N-best list) with respective values representing likelihoods of respective users originating the natural language user input. The output of the user recognition component 295 may be used to inform NLU processing, processing performed by a skill, as well as processing performed by other components of the system 120 and/or other systems.

Figure 3:
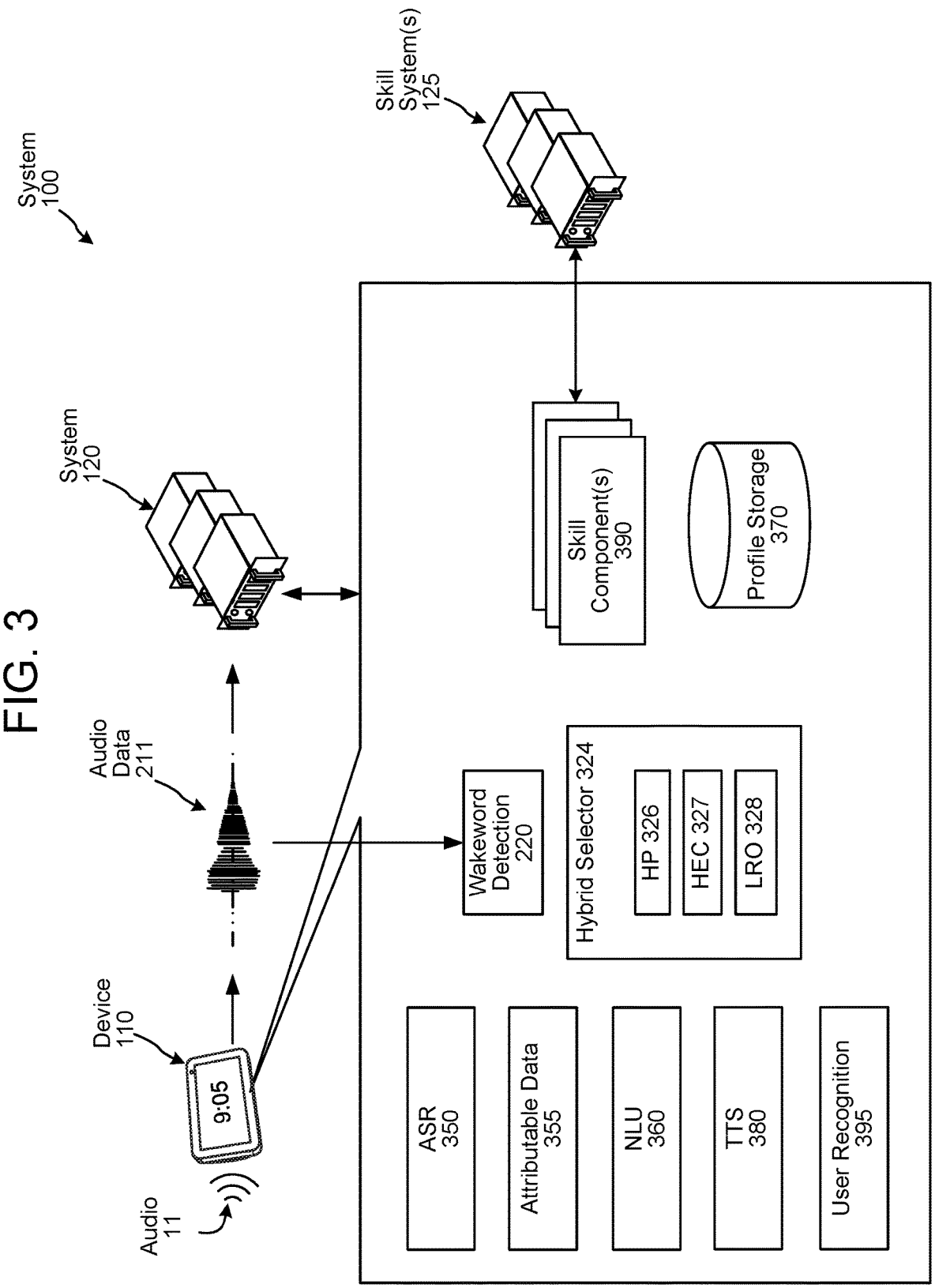
FIG. 3 is a conceptual diagram illustrating components that may be included in a device, according to embodiments of the present disclosure.

The foregoing describes illustrative components and processing of the remote system 120. In at least some embodiments, the device 110 may be configured to include some or all of the components, and perform some or all of the processing of the remote system 120 described above. FIG. 3 illustrates the system 100 as it may be configured to include a device 110 capable of performing speech processing and attributable data processing. Optimizing the utilization of on-device computing resources (e.g., processing resources, etc.) of the device 110, in at least some situations, can reduce latency so that the user experience with the device 110 is not negatively impacted by local processing tasks taking too long.

In general, the device 110 may be capable of capturing utterances with a microphone(s) and responding in various ways, such as by outputting content (e.g., audio) via an output device(s), which may be loudspeaker(s), a display(s), or any other suitable output component. In addition, the device 110 may be configured to respond to user speech by controlling one or more other devices that are co-located in an environment with the device 110, such as by sending a command to a second device via an input/output communications interface (e.g., a short range radio), the command instructing an operation to be performed at the second device (e.g., to turn on/off a smart light in the environment).

In addition to using a built-in microphone(s) to capture spoken inputs and convert them into digital audio data, a first device 110*a* may additionally or alternatively receive audio data from a second device 110*b* in the environment, such as when the second device 110*b* captures a spoken input from the user 5 and sends the audio data to the first device 110*a*. This may occur in situations where the second device 110*b* is closer to the user 5 and would like to leverage the processing capabilities of the first device 110*a*.

The device 110 may operate in conjunction with and/or under the control of a remote, network-based or network-accessible control system (e.g., the remote system 120). The remote system 120 may, in some examples be part of a network-accessible computing platform that is maintained and accessible via one or more network(s) 199 such as a wide area network. Network-accessible computing platforms such as this may be referred to using terms such as "on-demand computing", "software as a service (SaaS)", "platform computing", "network-accessible platform", "cloud services", "data centers", and so forth. The remote system 120 may be configured to provide particular functionality to large numbers of local (e.g., in-home, in-car, etc.) devices 110 of different users. The network(s) 199 is representative of any type of public or private, wide-area network, such as the Internet, which extends beyond the environment of the device 110. Thus, the wide area network may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies. In contrast, the device 110 and other local devices (located in the same environment as the device 110) may be connected to a private network associated with the environment (e.g., home, business, etc.), and the devices may communicate with the network(s) 199 via the private network.

In at least some embodiments, the remote system 120 may be configured to receive the audio data 211 from the device 110, to recognize speech corresponding to a spoken input in the received audio data 211 using a language processing component 240 (which may be referred to as a remote speech processing system), and to perform functions in response to the recognized speech. In at least some embodiments, these functions involve sending directives (e.g., commands), from the remote system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the remote system 120 over the network(s) 199, some or all of the functions capable of being performed by the remote system 120 may be performed by sending one or more directives over the network(s) 199 to the device 110, which, in turn, may process the directive(s) and perform one or more corresponding actions. For example, the remote system 120, using a remote directive that is included in response data (e.g., a remote response), may instruct the device 110 to output an audible response (e.g., using TTS processing performed by an on-device TTS component 380) to the user 5's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a nearby device (e.g., a directive to turn on a smart light). It is to be appreciated that the remote system 120 may be configured to provide other functions in addition to those discussed herein, such as, without limitation, providing step-by-step directions for navigating from an origin to a destination location, conducting an electronic commerce transaction on behalf of the user 5 as part of a shopping function, establishing a communication session between the user 5 and another user, and so on.

As noted with respect to FIG. 2, the device 110 may include a wakeword detection component XA20 configured to compare the audio data 211 to stored models used to detect a wakeword (e.g., "Alexa") that indicates to the device 110 that the audio data 211 is to be processed for determining a NLU result (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the remote system 120 and/or the local language processing component 340 (in which case the remote system 120 and the local language processing component 340 may process the audio data 211 in parallel, or at least partially in parallel, although the disclosure is not limited thereto). The wakeword detection component 220 may also send an indication, to the hybrid selector 324, representing a wakeword was not detected. In response to receiving such an indication, the hybrid selector 324 may refrain from sending the audio data 211 to the remote system 120, and may prevent the local language processing component 340 from further processing the audio data 211. In this situation, the audio data 211 can be discarded.

The device 110 may conduct its own speech processing using on-device language processing components, such as an ASR component 350 and an NLU 360, similar to the manner discussed above with respect to the ASR component 250 and the NLU component 360 of the remote system 120. The device 110 may also perform its own attributable data processing using an on-device attributable data component 355, similar to the manner discussed above with respect to the attributable data component 255. The device 110 may also internally include, or otherwise have access to, other components such as one or more skill components 390 capable of executing commands based on NLU results or other results determined by the device 110, a user recognition component 395 (configured to process in a similar manner to that discussed above with respect to the user recognition component 295 of the remote system 120), profile storage 370 (configured to store similar profile data to that discussed above with respect to the profile storage 270 of the remote system 120), or other components. In at least some embodiments, the profile storage 370 may only store profile data for a user or group of users specifically associated with the device 110. Similar to as described above with respect to FIG. 2, a skill component 390 may communicate with a skill system(s) 125.

In at least some embodiments, the on-device language processing components may not have the same capabilities as the language processing components of the remote system 120. For example, the on-device language processing components may be configured to handle only a subset of the spoken inputs that may be handled by the remote system 120. For example, such subset of spoken inputs may corresponding to local-type spoken inputs, such as those controlling devices or components associated with a user's home. In such circumstances the on-device language processing components may be able to more quickly interpret and respond to a local-type spoken input, for example, than processing that involves the remote system 120. If the device 110 attempts to process a spoken input for which the on-device language processing components are not necessarily best suited, the language processing results generated by the device 110 may indicate a low confidence or other metric indicating that the processing by the device 110 may not be as accurate as the processing done by the remote system 120.

The hybrid selector 324, of the device 110, may include a hybrid proxy (HP) 326. The HP 326 can be implemented as a layer within a voice services component 322 and may be configured to proxy traffic to/from the remote system 120. For example, the HP 326 may be configured to send messages to/from a hybrid execution controller (HEC) 327 of the hybrid selector 324. For example, command/directive data received from the remote system 120 can be sent to the HEC 327 using the HP 326. The HP 326 may also be configured to allow the audio data 211 to pass to the remote system 120 while also receiving (e.g., intercepting) this audio data 211 and sending the audio data 211 to the HEC 327.

In at least some embodiments, the hybrid selector 324 may further include a local request orchestrator (LRO) 328 configured to notify the local language processing component 340 about the availability of new audio data 211 that represents user speech, and to otherwise initiate the operations of the local language processing component 340 when new audio data 211 becomes available. In general, the hybrid selector 324 may control execution of the local language processing component 340, such as by sending "execute" and "terminate" events/instructions to the local language processing component 340. An "execute" event may instruct the local language processing component 340 to continue any suspended execution based on the audio data 211 (e.g., by instructing the local language processing component 340 to execute on a previously-determined intent in order to generate a directive). Meanwhile, a "terminate" event may instruct the local language processing component 340 to terminate further execution based on the audio data 211, such as when the device 110 receives directive data from the remote system 120 and chooses to use that remotely-generated directive data.

Thus, when the audio data 211 is received by the voice services component 322, the HP 326 may allow the audio data 211 to pass through to the remote system 120 and the HP 326 may also input the audio data 211 to the on-device language processing component 341 by routing the audio data 211 through the HEC 327 of the hybrid selector 324, whereby the LRO 328 notifies the local language processing component 341 of the incoming audio data 211. At this point, the hybrid selector 324 may wait for response data from either or both of the remote system 120 or the local language processing component 340. However, the disclosure is not limited thereto, and in some examples the hybrid selector 324 may send the audio data 211 only to the local language processing component 341 without departing from the disclosure. For example, the device 110 may process the audio data 211 locally without sending the audio data 211 to the remote system 120.

The local language processing component 240 is configured to receive the audio data 211 from the hybrid selector 324, to recognize speech in the audio data 211, to determine a user intent from the recognized speech, and to determine how to act on the user intent by generating NLU output data which may include directive data (e.g., instructing a component to perform an action). Such NLU output data may take a form similar to that as determined by the NLU component 260 of the remote system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data that is generated by the local language processing component 340 (and/or the remote system 120) may be formatted using Java, such as JavaScript syntax, or JavaScript-based syntax. This may include formatting the directive using JSON. In at least some embodiments, a device-generated directive may be serialized, much like how remotely-generated directives may be serialized for transmission in data packets over the network(s) 199. In at least some embodiments, a device-generated directive may be formatted as a programmatic API call with a same logical operation as a remotely-generated directive. In other words, a device-generated directive may mimic a remotely-generated directive by using a same, or a similar, format as the remotely-generated directive.

The language processing component 340 may process the audio data 211 to determine local NLU output data, which may include intent data and/or slot data, so that directives may be determined based on the intent data and/or the slot data. Thus, the language processing component 340 may process the audio data 211 and attempt to make a semantic interpretation of the spoken input represented by the audio data 211 (e.g., determine a meaning associated with the spoken input) and then implement that meaning. For example, the language processing component 340 may interpret the spoken input, in the audio data 211, in order to derive an intent or a desired action or operation from the user 5. This may include deriving pertinent pieces of information from the spoken input that allow the language processing component 340 to identify a second device in the environment, if the user, for example, intends to control a second device (e.g., a light in the user 5's house). The local language processing component 340 may also provide a dialog management function to engage in speech dialogue with the user 5 to determine (e.g., clarify) intents by asking the user 5 for information using synthesized speech prompts.

In at least some embodiments, the language processing component 340 may output a single NLU hypothesis determined to most likely representing the spoken input in the audio data 211. Alternatively, in at least some embodiments, the language processing component 340 may output multiple NLU hypotheses in the form of a lattice or an N-best list, with individual NLU hypotheses corresponding to respective confidence values or other values (such as probability values, etc.). In at least some embodiments, the language processing component 340 may be customized to the user 5 (or multiple users) who created a user account to which the device 110 is registered. For example, the language processing component 340 may process the audio data 211 based on known information (e.g., preferences) of the user 5, and/or on a history of previous interactions with the user 5.

NLU output data, as determined by the device 110 and/or the remote system 120, may include confidence data representing a confidence and/or estimated accuracy of the NLU output data. Such confidence data may come in the form of a numeric score, but may also come in different forms such as an indicator of Low, Medium, or High, a ranking, or other data. The confidence data may be set to a similar scale so that confidence data for one set of NLU results (e.g., NLU output data generated by the device 110) may be evaluated with regard to confidence data for another set of results (e.g., NLU output data generated by the remote system 120).

Thus, an NLU hypothesis may be selected as usable to respond to the spoken input, and the local language processing component 340 may send local response data (e.g., local NLU output data and/or local directive data) to the hybrid selector 324, such as a "ReadyToExecute" response, which can indicate that the local language processing component 340 has recognized an intent, or is ready to communicate failure (e.g., if the local language processing component 340 could not recognize an intent). The hybrid selector 324 may then determine whether to use directive data from the local language processing component 340 to respond to the spoken input, to use directive data received from the remote system 120, assuming a remote response is even received (e.g., when the device 110 is able to access the remote system 120 over the network(s) 199), or to generate output audio requesting additional information from the user 5.

The device 110 and/or the remote system 120 may associate a unique identifier with each spoken input. The device 110 may include the unique identifier when sending the audio data 211 to the remote system 120, and the response data from the remote system 120 may include the unique identifier to identify which spoken input the response data corresponds.

In at least some embodiments, the device 110 may include, or be configured to use, one or more skill components 390 that may work similarly to the skill component(s) 290 implemented by the remote system 120. The skill component(s) 390 may correspond to one or more domains that are used in order to determine how to act on a spoken input in a particular way, such as by outputting a directive that corresponds to the determined intent, and which can be processed to implement the desired operation. Accordingly, the term "skill" may be used interchangeably with the terms "speechlet," "domain," or "domain implementation." The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill component 125 may be configured in a local environment (e.g., home server and/or the like) such that the device 110 may communicate with the skill component 125 via a private network [such as a local area network (LAN)].

In order to generate a particular interpreted response, the language processing component 340 may apply grammar models and lexical information associated with the respective skill component(s) 390 to recognize one or more entities in the spoken input. In this manner the language processing component 340 may identify "slots" (i.e., particular words in the spoken input) that may be needed for later command processing. Depending on the complexity of the language processing component 340, it may also label each slot with a type of varying levels of specificity (such as noun, place, city, artist name, song name, device name, or the like). Each grammar model used by the language processing component 340 may include the names of entities (i.e., nouns) commonly found in speech about the particular skill component 390 (i.e., generic terms), whereas the lexical information (e.g., from a gazetteer) is personalized to the user 5 and/or the device 110. For example, a grammar model associated with a navigation skill component may include a database of words commonly used when people discuss navigation.

Accordingly, the intents identified by the language processing component 340 may be linked to skill component-specific grammar frameworks with "slots" or "fields" to be filled (e.g., resolved). Each slot/field corresponds to a portion of the spoken input that the language processing component 340 believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the language processing component 340 may parse the spoken input to identify words as subject, object, verb, preposition, etc., based on grammar rules and/or models, prior to recognizing named entities. The identified verb may be used by the language processing component 340 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The language processing component 340 may then search the corresponding fields in the skill component-specific and personalized lexicon(s), attempting to match words and phrases in the spoken input tagged as a grammatical object or object modifier with those identified in the database(s).

Various machine learning techniques may be used to train and operate models to perform various processes described herein, such as identifying user-identifiable data, identifying potentially attributable data, determining that a user input includes attributable data, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 4:
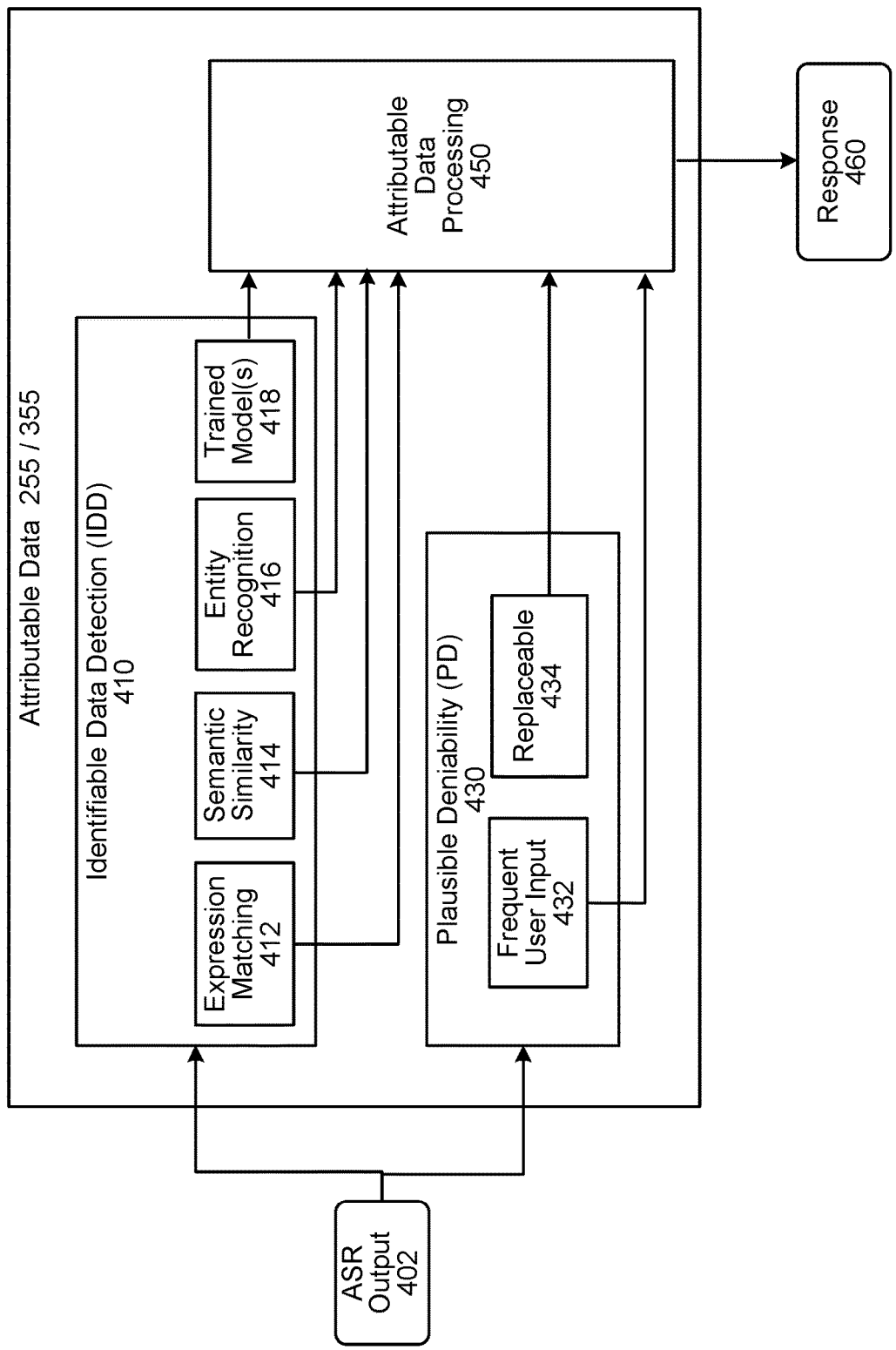
FIG. 4 is a conceptual diagram illustrating how a user input is determined to include sensitive data, according to embodiments of the present disclosure.

FIG. 4 conceptually illustrates how the attributable data component 255/355 may process a user input. The attributable data component 255/355 determines multiple signals using different techniques to determine if a user input includes attributable data, and which portions of the user input represent attributable data. These different techniques are described below, and may be separated into two main concepts: user-identifiable data detection and plausible deniability.

The attributable data component 255/355 may include an identifiable data detection (IDD) component 410 that is configured to detect user-identifiable data represented in a natural language user input. The IDD component 410 may include multiple components configured to detect user-identifiable data using different techniques. For example, the IDD component 410 may include an expression matching component 412, a semantic similarity component 414, an entity recognition component 416 and a trained model(s) 418.

The attributable data component 255/355 may include a plausible deniability (PD) component 430 that is configured to determine if the user input is potentially attributable to a single user. In other words, the PD component 430 determines if the content of the user input can be used to identify the user 5 in particular, or that the content of the user input is such that any number of users may have provided it. In doing so, the PD component 430 determines whether the system can plausibly deny that the user input was provided by the specific user 5. For example, the user input "My name is John Smith and my address is 123 Main Street, Gold City, New State" can directly identify the user 5 as John Smith who lives at 123 Main Street, Gold City, New State. As another example, the user input "What is the weather in Seattle?" cannot be used to identify the user 5. The technique that the PD component 430 employs in making such determinations may include determining if the user input has been provided, to the system, by multiple different users. The PD component 430 may include a frequent user input component 432 and a replaceable component 434.

The different signals, represented as output data, determined by the various components (412, 414, 416, 418, 432 and 434) may be processed by an attributable data processing component 450 of the attributable data component 255/355. The attributable data processing component 450 processes the various output data (as described in detail below) to make a final determination on whether the user input includes attributable data, and outputs response data 460 representing a final determination of the attributable data component 255/355.

It should be understood that the IDD component 410 and the PD component 430 may include fewer or more components, and any output data generated by these components may be provided to the attributable data processing component 450.

The components of the IDD component 410 may process token data of the ASR output data 402, where the token data corresponds to one word of the user input. For example, first token data may represent a first word of the user input, and may be associated with a first confidence score indicating the confidence level of the ASR component 250 in determining the first token data; second token data may represent a second word of the user input, and may be associated with a second confidence score indicating the confidence level of the ASR component 250 in determining the second token data; etc. In some embodiments, the token data is word embedding data corresponding to the word in the user input, and the components of the IDD component 410 process word embedding data.

Each component of the IDD component 410 may output a flag (e.g., positive or negative; yes or no; etc.) or other indicator representing whether the component has determined the user input includes user-identifiable data. In some embodiments, each component of the IDD component 410 may output a confidence score with respect to each word of the natural language user input, with each confidence score indicating a likelihood of the particular word representing user-identifiable data. In some embodiments, each component of the IDD component 410 may output a confidence score indicating a likelihood that the user input includes user-identifiable data, or conversely a confidence score indicating a likelihood that the user input does not include user-identifiable data.

The expression matching component 412 may be configured to determine that a user input includes user-identifiable data by matching a portion(s) of the user input to one or more stored words/phrases. The expression matching component 412 may access stored data including various words and phrases that represent user-identifiable data. For example, the stored data may indicate that "prescription" or "medical record number" represents user-identifiable data. The stored data may also indicate that one or more words following the stored words, such as "prescription" or "medical record number" represent user-identifiable data. The stored data may also include rules for expressions that represent user-identifiable data. For example, a rule in the stored data may indicate that 9 digits in sequence in a user input represents a social security number. As another example, another rule in the stored data may indicate 10 digits in sequence represents a phone number. If the expression matching component 412 determines a portion(s) of the user input matches stored data (i.e., matches a stored word, matches a stored phrase, or matches a stored rule), the expression matching component 412 generates output data (e.g., first output data). The output data may include a flag representing whether the user input includes user-identifiable data. The output data may also include the portion(s) of the user input that represents user-identifiable data. For example, for the user input "My address is 123 Main Street, Gold City, New State," the output data may include "123 Main Street, Gold City, New State." The output data may also include a confidence score indicating a confidence level of the expression matching component 412 in determining that the user input includes user-identifiable data.

The semantic similarity component 414 may be configured to determine if a portion(s) of the user input is semantically similar to a word(s) or phrase(s) representing user-identifiable data. For example, the semantic similarity component 414 determines the meaning of the words in the user input are similar to the meaning of words that convey user-identifiable data. The semantic similarity component 414 may access stored data indicating words/phrases representing user-identifiable data. The stored data may be indexed data that the semantic similarity component 414 uses to find words that are semantically similar to the words of the user input. The semantic similarity component 414 may use a k nearest neighbors (kNN) algorithm and the indexed data. For example, the stored data may include "surgery" which may be mapped to a word "operation" in the user input as they have semantically similar meanings. Based on the semantic similarity of a portion of the user input to stored data, the semantic similarity component 414 generates output data (e.g., second output data). The output data may include a flag representing whether the user input includes user-identifiable data. The output data may also include the portion of the user input that represents user-identifiable data. For example, for the user input "Please call my doctor for my scheduled heart operation," the output data may include "heart operation." The output data may also include a confidence score indicating a confidence level of the semantic similarity component 414 in determining that the user input includes user-identifiable data. The confidence score in this case may be determined using the indexed data and may represent how confident the semantic similarity component 414 is that the word of the user input is semantically similar to the stored data.

The entity recognition component 416 may be configured to determine an entity type represented in the user input that corresponds to user-identifiable data. If the entity recognition component 416 determines an entity type (in the user input) corresponds to user-identifiable data, then the user input is flagged. The entity recognition component 416 may use stored data representing entity types that correspond to user-identifiable data. The entity recognition component 416 may be configured to perform NER processing as described above in relation the the NLU component 260/360. For example, if the user input is "I live at 1234 ABC street," the entity type, determined by the entity recognition component 416 as representing user-identifiable data, may be 'address.' Based on determining an entity type corresponding to user-identifiable data is represented in the user input, the entity recognition component 416 generates output data (e.g., third output data). The output data may include a flag representing whether the user input includes user-identifiable data. The output data may also include the portion of the user input that represents the entity type corresponding to user-identifiable data. The output data may also include the entity type. For example, for the user input "I live at 1234 ABC Street," the output data may include "1234 ABC Street" and entity type: address. The output data may also include a confidence score indicating a confidence level of the entity recognition component 416 in determining the entity type represented in the user input.

The trained model(s) 418 may be configured to process word embedding data corresponding to a word of the user input and determine if that word represents user-identifiable data. The trained model(s) 418 may process more than one word at a time to use contextual information in the user input to determine if one or more words of the user input represent user-identifiable data. The trained model(s) 418 may output a confidence score or probability indicating a likelihood of the particular word(s) of the user input representing user-identifiable data. As such, the output of the trained model(s) 418 may be a vector including a confidence score for each word of the user input. For example, for the user input "I am John Smith," the output vector may be [0.1, 0.1, 0.8, 0.7]. The output data (e.g., fourth output data) provided to attributable data processing component 450 may include the output vector generated by the trained model 418. In other embodiments, the output data provided to the attributable data processing component 450 may only include words associated with a threshold confidence score that represent user-identifiable data, and may also include the corresponding confidence scores. For example, given the above example, the output data of the trained model(s) 418 may be "John Smith" and [0.8, 0.7].

The trained model(s) 418 may be one or more machine learning models, and may be one or more of a neural network(s) (e.g., RNN, CNN, DNN, etc.), a probabilistic graph(s), a statistical model(s), a regression model(s), a random forest(s), a classifier(s) or other type of machine learning models. The trained model(s) 418 may be trained using training data including word embedding data corresponding to words that represent user-identifiable data. In some embodiments, the training data may include a first set of user inputs, each of which include user-identifiable data, and the first set of user inputs may be labeled as positive samples. The training data may include a second set of user inputs derived from a database storing past user inputs received by the system 120 and not including user-identifiable data, where the second set of user inputs may be labeled as negative samples. In some embodiments, each user input of the first set of user inputs in the training data may be associated with a label identifying the type of user-identifiable data included in the user input.

The plausible deniability (PD) component 430 may include a frequent user input component 432 and a replaceable component 434. The frequent user input component 432 may be configured to determine if the instant user input is a user input frequently received by the system 120 from a number of different users. The frequent user input component 432 may access stored data storing past user inputs received by the system 120. Using the stored data, the frequent user input component 432 may determine whether the instant user input has been received by the system 120 in the past. In some embodiments, the frequent user input component 432 may determine a past user input from the stored data based on an exact match to the instant user input. In other embodiments, the frequent user input component 432 may determine a past user input from the stored data based on a semantic similarity of the past user input to the instant user input. If the frequent user input component 432 identifies a past user input from the stored data that corresponds to the instant user input, the frequent user input component 432 may then determine a number of times the past user input was received by the system 120 and how many different users provided the past user input. If that number of times is above a threshold value, then the frequent user input component 432 may determine that the user input is potentially attributable to a generic user/a number of different users. The frequent user input component 432 may generate output data including a flag or other indicator representing that the user input is potentially attributable to multiple users. For example, for the user input "What is the weather in Seattle?", the frequent user input component 432 may determine that it was received by the system 120 more than 100 times, and may output a negative flag for the user input, with the negative flag indicating the user input is potentially attributable to multiple users. In another example, for the user input "What is the weather in Spokane?" the frequent user input component 432 may determine that it was received by the system 120 less than 10 times, and may output a positive flag for the user input, with the positive flag indicating the user input is potentially attributable to a single user. The output data of the frequent user input component 432 may include a number of times the user input has been received at the system 120.

The replaceable component 434 may be configured to determine whether a particular output can be generated from the instant user input and can also be generated from another user input with equal confidence/likelihood. In other words, the objective of the replaceable component 434 is to preserve privacy on a user input x, such that given a dataset D (e.g., a set of user inputs received by the system 120), an output X from the replaceable component 434 satisfies a probability constraint that states: this output X could have equally been generated from the user input x, or another query x' in the dataset D.

The replaceable component 434 may split the user input into two portions: "secret" and "public." The public portion of the user input may contain content that is publicly available (e.g., obtainable from a public internet site/page). For example, the replaceable component 434 may search databases or information publicly available on the Internet to determine that the public portion of the user input. In some embodiments, the public portion of the user input may be identified based on how many different users have provided a user input containing that portion. For example, if a threshold number of different users have provided the portion (as part of past user inputs) then the portion may be identified as public. In other embodiments, a portion of the user input may be identified as public if the portion is publicly available and the portion is provided by a threshold number of different users. In some cases, a portion of the user input may not be identified as public if the portion is publicly available but the portion is not provided by a threshold number of different users, thus, indicating that the portion is potentially attributable to the particular user 5.

The portions of the user input that are not public, may be designated as secret portions. For the secret portion of the user input, the replaceable component 434 may substitute a word(s) in the secret portion with a word(s) that is semantically similar. The word(s) used as substitution may represent non-identifiable data. The replaceable component 434 may generate output data including a flag or other indicator. The output data may include a negative flag (or false flag)

when the replaceable component 434 does not substitute any words in the user input (i.e. does not change the user input). The output data may include a positive flag (or true flag) when the replaceable component 434 substitutes at least one word in the user input. The negative flag from the replaceable component 434 may indicate to the attributable data processing component 450 that the user input is potentially attributed to the particular user 5 and a semantically similar substitute for the user-identifiable data/secret portions cannot be found. The positive flag from the replaceable component 434 may indicate to the attributable data processing component 450 that there are semantically similar substitutes for the user-identifiable data/secret portions in the user input, and that the user input can be changed so that it cannot be attributed to the particular user 5.

In some embodiments, additional data indicating whether the user input includes attributable data may be determined (by the IDD component 410 or the PD component 430). Such additional data may relate to an indication of how much new/unique information is being provided by the user input to the system 120. For example, from the system's perspective, if the user input is providing a high amount of new information (i.e. information the system 120 has not received or processed before), then the user input is likely to be unique and attributable to the particular user 5. In that case, the additional data may indicate that the user input includes attributable data. In another example, if the user is providing little or no new information to the system 120 (i.e. the system has received or processed the information in the user input before), then the user input is likely not unique and not attributable to the particular user 5. In that case, the additional data may indicate that the user input does not include attributable data. In determining the additional data, the attributable data component 255/355 may process stored data representing past user inputs received by the system 120.

The attributable data processing component 450 is configured to process the output data generated by the components of the IDD component 410 and the PD component 430 described above. The attributable data processing component 450 may make a final determination, based on the processing of the various components of the IDD component 410 and the PD component 430, on whether the user input includes attributable data, as well as which word(s) represents the attributable data. The attributable data processing component 450 may also use the ASR output data 402, in particular, the confidence score associated with the word(s). For example, the attributable data processing component 450 may compare or combine/aggregate the output data (words representing attributable data and confidence scores) and the ASR output data 402. The attributable data processing component 450 may use one or more techniques, such as, decision trees, ranking, and averaging, described in detail below to process the output data of the various components (412, 414, 416, 418, 432, and 434).

The attributable data processing component 450 may implement a decision tree that analyzes the output data from the various components to make the final determination. The decision tree may compare the output data from one component with that from another component. Based on the comparisons, the attributable data processing component 450 may traverse the decision tree to arrive at a final determination. For example, if the semantic similarity component 414 outputs a negative flag (indicating that the user input does not include attributable data) and the replaceable component 434 outputs a negative flag (indicating that no portion of the user input is replaced/redacted to mask attributable data), then the final determination of the decision tree may be that the user input does not include—attributable data. In another example, if the expression matching component 412 outputs a negative flag, the semantic similarity component 414 outputs a positive flag, the entity recognition component 416 outputs a positive flag, and the frequent user input component 432 outputs a positive flag, then the final determination may be that the user input includes attributable data.

The attributable data processing component 450 may also use a decision tree to compare the words indicated as representing attributable data by the various components. For example, the expression matching component 412 may indicate a first word of the user input as representing attributable data, the semantic similarity component 414 may indicate the first word and a second word of the user input as representing attributable data, and the entity recognition component 416 may indicate that first word and the second word correspond to an entity type representing attributable data. Based on this information, the attributable data processing component 450 may determine that the first word and the second word of the user input represent attributable data. Additionally, the attributable data processing component 450 may use the confidence scores associated with each of the output data. For example, the expression matching component 412 may indicate a first word with a first confidence score as representing attributable data, and the semantic similarity component 414 may indicate the first word with a second confidence score and a second word with a third confidence score as representing attributable data. The attributable data processing component 450 may determine that the first confidence score and the second confidence score satisfy a threshold score, and the third confidence score is lower than a threshold value. The final determination, in this case, may be that the first word of the user input represents attributable data, but the second word does not.

The attributable data processing component 450 may rank the output data from the various components based on their respective confidence scores. The output data with the highest ranked confidence score may then be used as the final determination with respect to the user input. For example, if the output data of the expression matching component 412 has the highest confidence, then the final determination may be that output data, which may indicate that the second word in the user input represents attributable data.

In making the final determination, the attributable data processing component 450 may also consider the ASR output data 402 to assess how confident the ASR component 250 is in determining a particular word is represented in the user input. For example, the ASR output data 402 may indicate that the user input includes the word "prescription" with a low confidence score (a confidence score lower than a threshold), and the output data from one or more of the components of the IDD component 410 may indicate that the word "prescription" represents attributable data with a high confidence score (a confidence score higher than a threshold). Based on the ASR confidence score being low for the word "prescription," the attributable data processing component 450 may determine that the user input does not include attributable data, at least based on the word "prescription" alone. In some embodiments, in this case, the attributable data processing component 450 may rely on other words in the user input (as detected by the components of the IDD component 410) to make the final determination that the user input includes attributable data.

In some embodiments, the attributable data processing component 450 may aggregate (sum up) the confidence scores associated with the output data from the various components (412, 414, 416, 418, 432 and 434). The attributable data processing component may aggregate the scores if they correspond to the same word in the user input as representing attributable data. The attributable data processing component 450 may then determine if the aggregated confidence scores satisfy a threshold score.

In other embodiments, the attributable data processing component 450 may determine an average of the confidence scores associated with the output data from the various components (412, 414, 416, 418, 432 and 434), by aggregating the confidence scores and dividing it by the number of components that provided the confidence scores. In some cases, one or more of the components of the IDD component 410 or the PD component 430 may not provide output data or may indicate a negative flag in the output data representing that the user input does not include attributable data. In some cases, the attributable data processing component 450 may use '0' as the confidence score for such components in determining the average. For example, given N components, n−1 component provide a confidence score, while the nth component does not, the average may be determined by adding the n−1 confidence scores and dividing the sum with N.

In some embodiments, the attributable data processing component 450 may use a machine learning model to process the output data from the various components (412, 414, 416, 418, 432 and 434). The machine learning model may be a neural network (e.g., CNN, RNN, DNN, etc.), a probabilistic graph, a statistical model, or other type of machine learning models.

In some embodiments, the attributable data processing component 450 may use a policy engine implementing reinforcement-based learning or reward-based learning to select an action from an action space given the state data. In this case, the action space may represent various final determinations that may be made by the attributable data processing component 450, such as, outputting a negative flag, outputting a positive flag, accepting the output data with the highest confidence score, accepting the output data of the IDD component 410, accepting the output data of the PD component 430, and other actions. The state data, in this case, may be derived from the output data generated by the various components (412, 414, 416, 418, 432 and 434). The policy engine may receive reward signal, after selection of an action and based on the results of the action, and may use the reward signal to update the policy engine to select an action when processing the next/subsequent user input.

In some embodiments, the attributable data processing component 450 may assign a weight to the output data of a particular component based on the configuration of the component. Some of the components of the IDD component 410 may be configured to detect some types of user-identifiable data while other components of the IDD component 410 may be configured to detect other types of user-identifiable data. In some cases, some of the components may detect some types of user-identifiable data more accurately than other components. For example, the expression matching component 412 may be configured to detect (or may detect more accurately) user-identifiable data corresponding to credit card numbers or bank account information, while the semantic similarity component 414 may be configured to detect (or may detect more accurately) user-identifiable data corresponding to medical information. The attributable data processing component 450 may assign a first weight to the output data from the expression matching component 412 and a second weight to the output data from the semantic similarity component 414. In the case that the user-identifiable data of the user input corresponds to credit card information, the first weight may be higher than the second weight. In the case that the user-identifiable data of the user input corresponds to medical information, the second weight may be higher than the first weight.

In some embodiments, the attributable data processing component 450 may assign a weight to the output data based on whether it was received from the IDD component 410 or the PD component 430. The assignment of weight in this case may depend on the type of user-identifiable data included in the user input. The attributable data processing component may assign a first weight to output data from the IDD component 410 and a second weight to output data from the PD component 430.

The attributable data processing component 450 may process the weighted output data using the decision tree, ML model, or other processing techniques or may be ranked by the attributable data processing component 450, as described above.

The attributable data component 255/355 may be configured to detect various types of user-identifiable data, including, but not limited to the types described herein. For example, one type of user-identifiable data may include contact details, such as, first and last name, phone number, email address, government-issued identification numbers (social security number, passport numbers, driver's license number, tax payer identification number, etc.), and birth date. Another type of user-identifiable data may include location information, such as, home address, work address, zip codes, latitude and longitude, building names, etc. Another type of user-identifiable data may include hardware identifiers, such as, IP address, MAC address, device serial number, etc. Another type of user-identifiable data may include account information, such as, account customer identifiers, account name, social media handles (e.g., twitter handle, Instagram handle, etc.), personal PIN or passcode, bank account information, full credit card number, last 4 digits of credit card number, health insurance number, vehicle license plate, vehicle identification number, flight reward program number, etc. Another type of user-identifiable data may include confirmation numbers, such as, shopping orders, flight, hotel or other booking numbers, reservation numbers, etc.

In some embodiments, the attributable data component 255/355 may determine that certain data, that may appear to be user-identifiable data, is to not be treated as user-identifiable data. For example, a first and last name in a user input that corresponds to a celebrity may be determined to be non-identifiable data or non-attributable data. As another example, an address of a landmark building or publicly-held event may be determined to be non-attributable data. Such information may be built into the components of the IDD component 410 so that celebrity names or landmark addresses, for example, are detected as non-identifiable data. In other embodiments, such information may be built into components of the PD component 430 so that celebrity names or landmark addresses, for example, are determined to be potentially attributable to multiple users cannot be used to identify the particular user 5.

Using multiple signals/output data determined by different components helps in determining whether a user input includes attributable data. For example, the expression matching component 412 may determine that 3 consecutive digits represents a card verification value (CCV) number for a credit card, while in fact the 3 consecutive digits in a particular user input may be related to something else. One or more of the other components, such as the semantic similarity component 414, the entity recognition component 416 and/or the trained model 418, may identify the 3 consecutive digits as non-identifiable data. Based on processing these different determinations, the attributable data component 255/355 may more accurately detect attributable data represented in a user input.

The attributable data processing component 450 generates the response data 460 based on its final determination with respect to the user input including attributable data. The response data 460 may include a flag or other indicator representing whether the user input includes attributable data. The response data 460 may also include a portion(s) of the user input that represents attributable data, if it includes attributable data. The response data 460 may also include a confidence score associated with the confidence level of the attributable data processing component 450 in making the final determination. The response data 460 may also include a user input identifier, that may be used later to delete/discard data corresponding to the user input after the system 120 has provided an output responsive to the user input.

The response data 460 may be provided to other components of the system 120 or the device 110 to perform further processing. For example, the response data 460 may be provided to the NLU component 260 via the orchestrator 230 or to the NLU component 360 by the attributable data component 355. After the system 120 has provided an output responsive to the user input, for example, using data determined by a skill component 290/390, the system 120 may delete/discard data corresponding to the user input identifier.

In some embodiments, the user input may be used to configure various components of the system 120. For example, the user input may be labeled/annotated to be used as training data in training one or more components of the system 120. User inputs that are determined to include attributable data may be discarded instead of being used for such purposes. In other embodiments, user inputs that are determined to include attributable data may be routed to a first server, instead of a second server, where the first server may be a secured site or may employ certain techniques and security measures that are not employed at the second server.

In some embodiments, the attributable data component 255/355 may replace portions of the user input that represent user-identifiable data or potentially attributable data, and output a redacted version of the user input along with the response data 260. For example, for the user input "My name is John Smith and I live at 123 Main Street, Gold City, New State," the redacted version of the user input may be "My name is [user-identifiable data] and I live at [user-identifiable data]," or "My name is J_S_and I live at_, Gold City, New State." The redacted version of the user input may be used for labeling/annotation for training data. In some embodiments, the redacted version of the user input may be provided to other components of the system 120 for processing of the natural language user input at runtime.

Figure 5A:
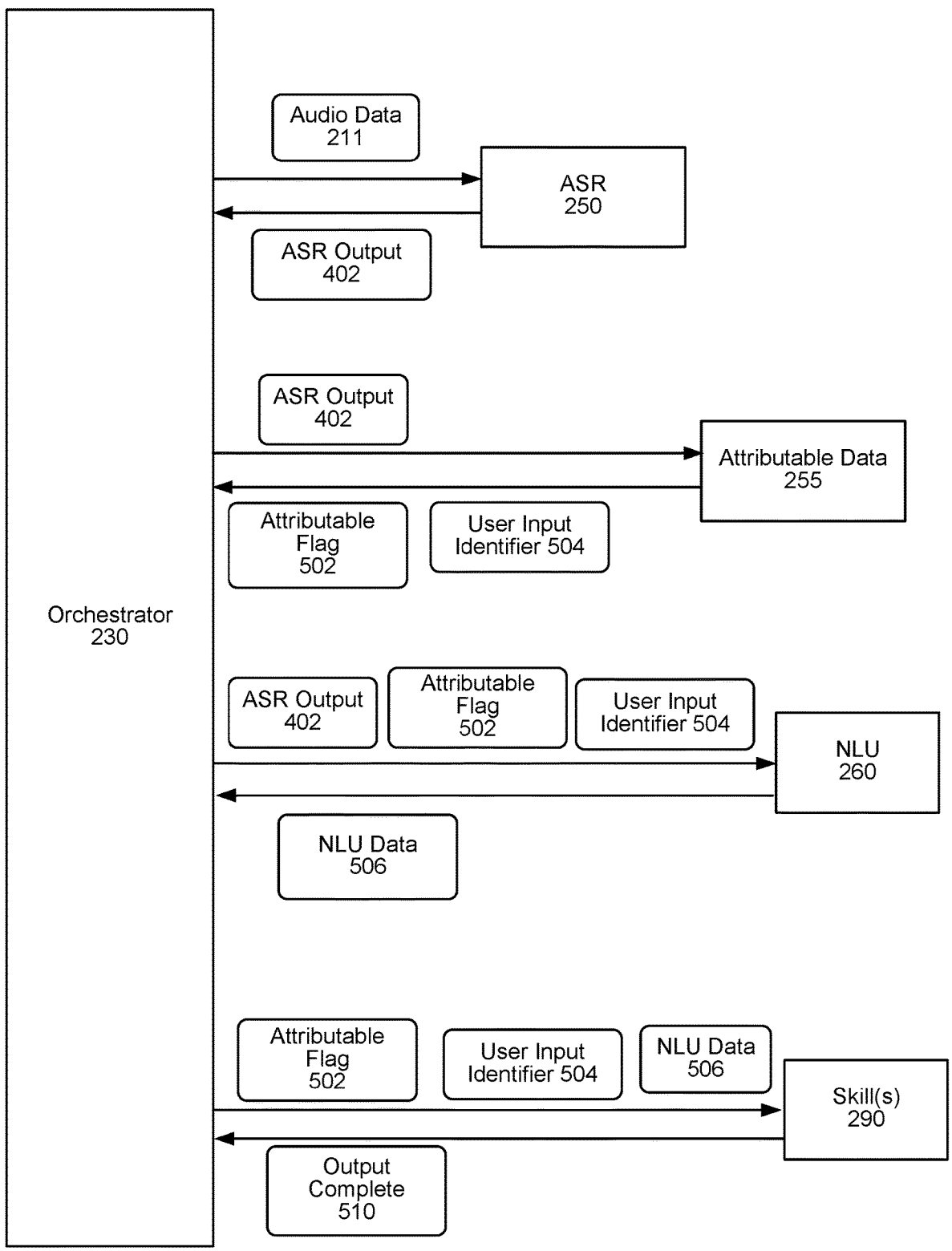
FIGS. 5A and 5B conceptually illustrate how data is processed by various components, according to embodiments of the present disclosure.
Figure 5B:
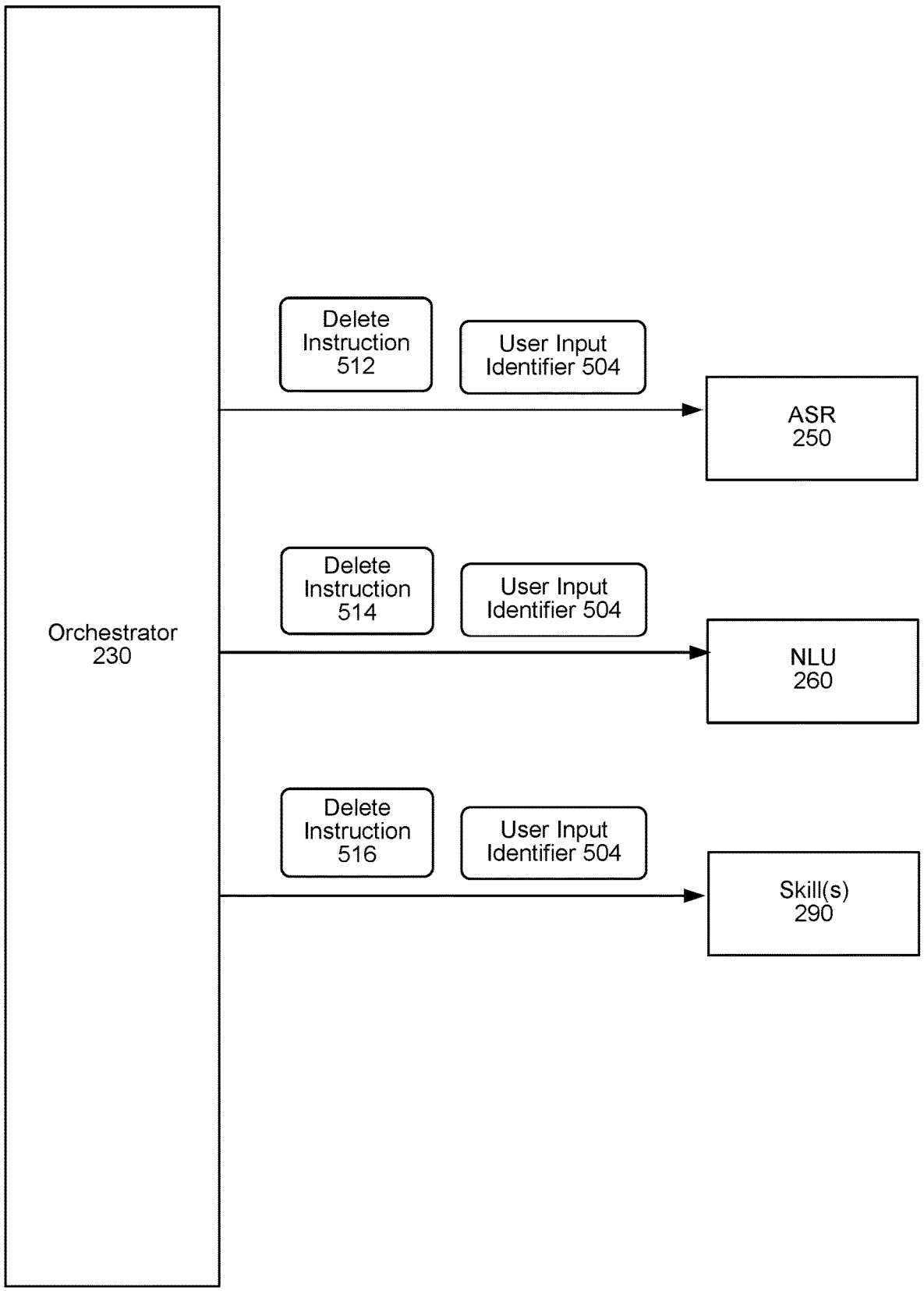

FIGS. 5A and 5B conceptually illustrate how data is processed by various components, according to embodiments of the present disclosure. The orchestrator 230 may send the audio data 211 to the ASR component 250 for processing as described above. The ASR component 250 may determine ASR output data 402 corresponding to the audio data 211, and send the ASR output data 402 to the orchestrator 230. The orchestrator 230 may send the ASR output data 402 to the attributable data component 255.

The attributable data component 255 may process the ASR output data 402 as described above in relation to FIG. 4. The attributable data component 255 may determine a attributable flag 502 indicating that the natural language user input represented in the audio data 211 includes attributable data. The attributable flag 502 may be generated by the attributable data processing component 450 as the final determination with respect to the whether or not the user input includes attributable data. In the example illustrated in FIGS. 5A and 5B, the value of the attributable flag 502 is positive (or yes) indicating that the user input includes attributable data. The attributable data component 255 may also determine a user input identifier 504 identifying the user input represented in the audio data 211. The user input identifier 504 may be associated with data corresponding to the audio data 211 by the orchestrator 230.

The orchestrator 230 may send the ASR output data 402, the attributable flag 502 and the user input identifier 504 to the NLU component 260. The NLU component 260, using the ASR output data 402, may determine NLU data 506 corresponding to the user input, as described above. The NLU data 506 may include a NLU hypothesis representing an intent and one or more slot values corresponding to the user input/audio data 211.

The orchestrator 230 may send the NLU data 506, the attributable flag 502 and the user input identifier 504 to the skill(s) component 290. The skill(s) component 290 may process the NLU data 506, as described above, to determine an output responsive to the user input/audio data 211. Once the output is presented to the user 5, the skill(s) component 290 may send an output complete indication 510 to the orchestrator 230. In some embodiments, the skill(s) component 290 may send the output complete indication 510 to the orchestrator 230 after the skill(s) component 290 determines the output responsive to the user input but prior to presenting the output to the user 5.

Referring to FIG. 5B, in response to receiving the output complete indication 510 and based on the attributable flag 502 being positive, the orchestrator 230 may send a delete instruction 512 along with the user input identifier 504 to the ASR component 250. The delete instruction 512 may instruct the ASR component 250 to delete data corresponding to the user input identifier 504 that was determined by the ASR component 250 (e.g., the ASR output data 402). Additionally, the orchestrator 230 may send a delete instruction 514 along with the user input identifier 504 to the NLU component 260. The delete instruction 514 may instruct the NLU component 260 to delete data corresponding to the user input identifier 504 that was determined by the NLU component 260 (e.g., the NLU data 506). The orchestrator 230 may also send a delete instruction 516 along with the user input identifier 504 to the skill(s) component 290. The delete instruction 516 may instruct the skill(s) component 290 to delete data corresponding to the user input identifier 504 that was determined by the skill(s) component 290 (e.g., the output data responsive to the user input).

In some embodiments, the orchestrator 230 may send the delete instructions 512, 514 and 516 to the respective components at substantially the same time or in parallel after the output complete indication 510 is received. In some embodiments, the orchestrator 230 may send the delete instructions 512, 514 and 516 to the respective components when sending the attributable flag 502, and the respective component may delete the appropriate data once the data is sent to the orchestrator 230. For example, the orchestrator 230 may send the delete instructions 514 to the NLU component 260 when sending the attributable flag 502 and the ASR output data 402. The NLU component 260 may send the NLU data 506 to the orchestrator 230 and then delete the NLU data 506 based on the delete instructions 516.

In some embodiments, the device 110 may include on-device processing components as described in relation to FIG. 3. In some embodiments, the ASR component 350 may receive and process the audio data 211 and determine the ASR output data 402. The ASR component 350 may send the ASR output data 402 to the attributable data component 355 to determine whether the user input represented in the audio data 211 includes attributable data. Some of the processing with respect to the user input/audio data 211 may be performed by the system 120. In which case, the attributable data component 355 (on the device 110) may send the attributable flag corresponding to the user input to the system 120, and may send instructions to the components in the system 120 to delete data corresponding to the user input/audio data 211.

It should be understood that the functionalities of the attributable data component 255/355 can be performed at various devices that are capable of receiving natural language user inputs, but is not configured to perform SLU processing and does not include an ASR component or an NLU component. For example, such a device may process text data representing the natural language user input to determine whether the input includes attributable data or not as described herein.

Figure 6:
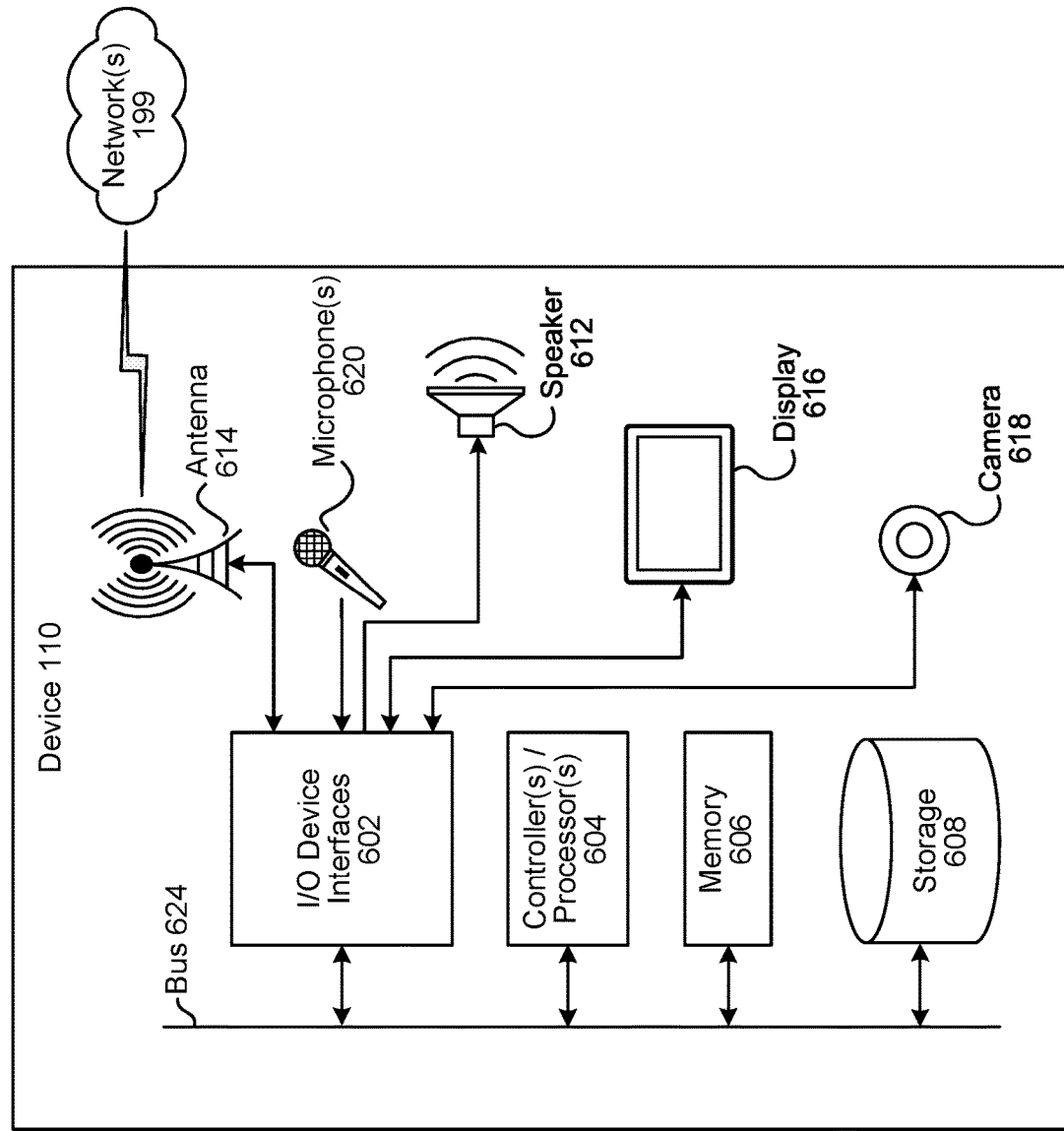
FIG. 6 is a block diagram conceptually illustrating example components of a device, according to embodiments of the present disclosure.
Figure 7:
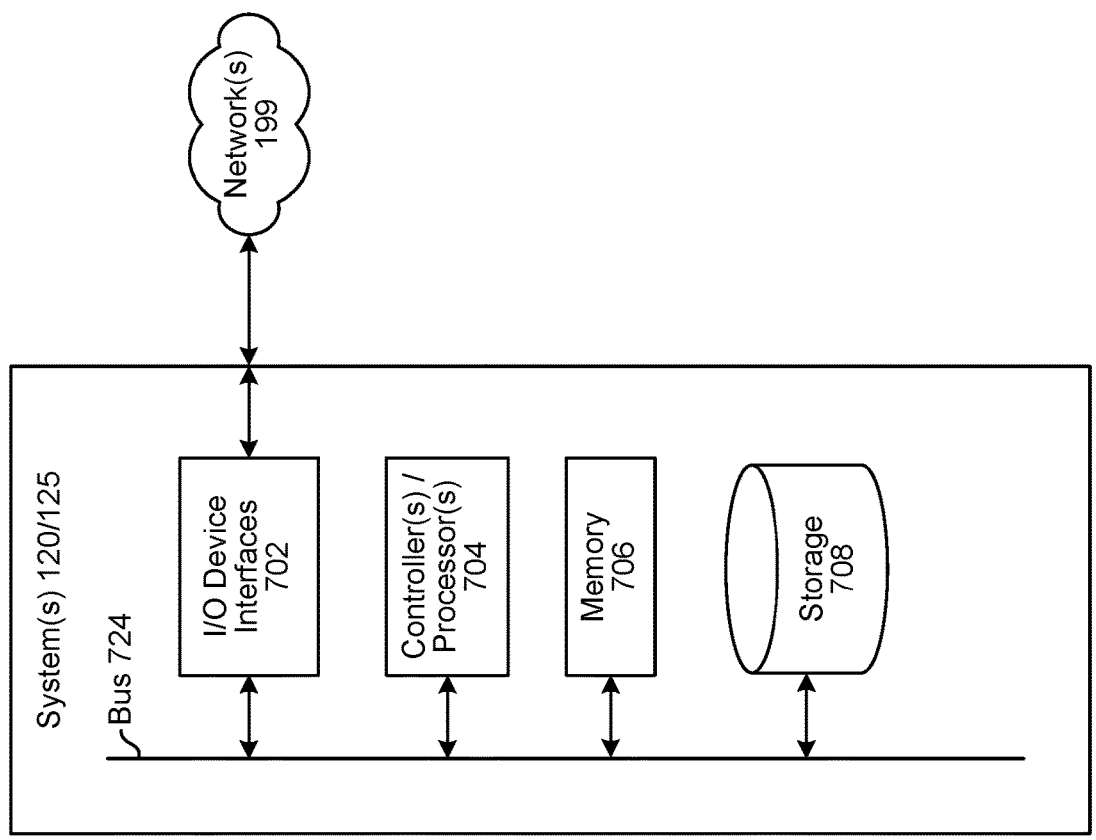
FIG. 7 is a block diagram conceptually illustrating example components of a system, according to embodiments of the present disclosure.

FIG. 6 is a block diagram conceptually illustrating example components of a device 110 according to the present disclosure. FIG. 7 is a block diagram conceptually illustrating example components of a system, such as the system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/125) may also include a data storage component (608/708) for storing data and controller/processor-executable instructions. Each data storage component (608/708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (602/702).

Computer instructions for operating each device (110/120/125) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/125) includes input/output device interfaces (602/702). A variety of components may be connected through the input/output device interfaces (602/702), as will be discussed further below. Additionally, each device (110/120/125) may include an address/data bus (624/724) for conveying data among components of the respective device. Each component within a device (110/120/125) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device 110, the system 120, and/or a skill system 125 may include their own dedicated processors, memory, and/or storage. Alternatively, one or more of the components of the device 110, the system 120, and/or a skill system 125 may utilize the I/O interfaces (602/702), processor(s) (604/704), memory (606/706), and/or storage (608/708) of the device(s) 110, system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 125, as described herein, are illustrative, and may be located as a stand-alone device or may be included, in whole or in part, as a component of a larger device or system.

Figure 8:
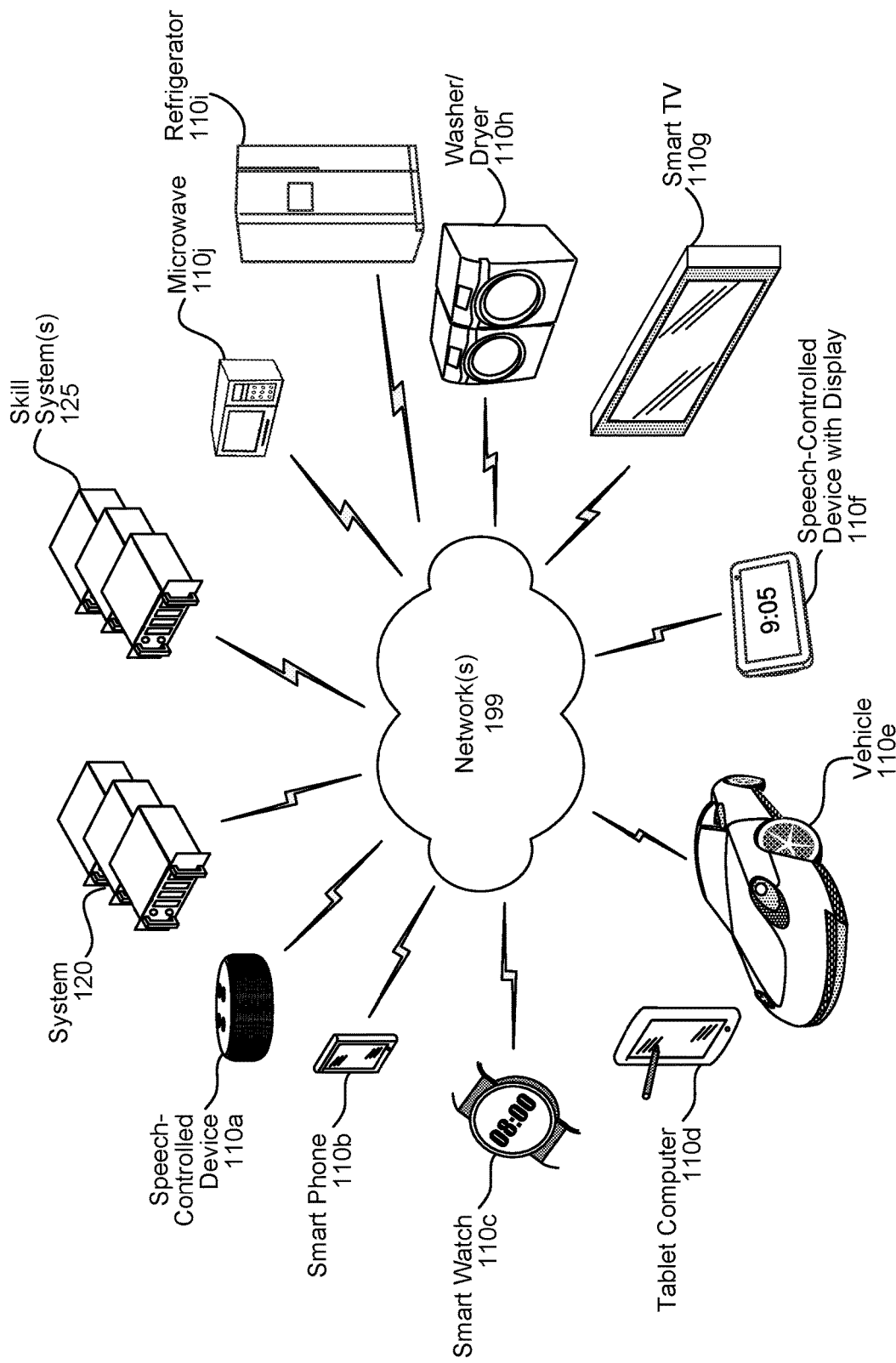
FIG. 8 illustrates an example of a computer network for use with the overall system, according to embodiments of the present disclosure.

As illustrated in FIG. 8, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving audio data representing a natural language user input;
performing automatic speech recognition (ASR) processing on the audio data to determine ASR output data;
processing the ASR output data to determine an entity type corresponding to a first portion of the natural language user input;
based on the entity type, determining the first portion is able to be used to identify a user associated with the natural language user input;
receiving first stored data that is able to be used to identify the user;
processing the ASR output data to determine that a second portion of the natural language user input is semantically similar to the first stored data;
based on the second portion being semantically similarly to the first stored data, determining the second portion is able to be used to identify the user;
performing natural language understanding (NLU) processing on the ASR output data to determine NLU output data;
using the NLU output data, determining output data responsive to the natural language user input;
sending the output data to a device; and deleting the audio data based on determining the first portion and the second portion is able to be used to identify the user.

2. The computer-implemented method of claim 1, further comprising:
determining a first confidence score representing a likelihood of the entity type corresponding to the first portion;
determining a second confidence score representing a likelihood of the second portion being semantically similar to the first stored data;
using a trained model, processing the ASR output data to determine:
a third confidence score representing a likelihood that the first portion is able to be used to identify the user, and
a fourth confidence score representing a likelihood that the second portion is able to be used to identify the user;
determining that the first confidence score and the third confidence score satisfy a first condition;
determining that the second confidence score and the fourth confidence score fail to satisfy the first condition;
based on the first confidence score and the third confidence score satisfying the first condition, determining the first portion is able to be used to identify the user; and
based on the second confidence score and the fourth confidence score failing to satisfy the first condition, determining the second portion is able to be used to identify the user.

3. The computer-implemented method of claim 1, further comprising:
receiving second stored data representing past natural language user inputs;
determining, in the second stored data, a first past natural language user input semantically similar to the natural language user input;
determining a number of times the first past natural language user input was received;
determining the number of times fails to satisfy a threshold value;
based on the number of times failing to satisfy the threshold value, determining the natural language user input is able to be used to identify the user.

4. The computer-implemented method of claim 1, further comprising:
receiving second ASR output data corresponding to a second natural language user input;
receiving second stored data representing past natural language user inputs;
determining, in the second stored data, a first past natural language user input semantically similar to the second natural language user input;
determining a number of times the first past natural language user input was received;
determining the number of times satisfies a threshold value;
determining, using the second ASR output data, that a third portion of the second natural language user input is able to be used to identify a second user;
determining an alternative representation of the third portion, wherein the alternative representation is unable to be used to identify the second user;
determining text data corresponding to the second ASR output data including the alternative representation instead of the third portion;
performing NLU processing on the text data to determine second NLU output data;
using the second NLU output data, determining second output data responsive to the second natural language user input;
sending the second output data to a second device; and
storing at least one of the ASR output data or the NLU output data based at least in part on:
the number of times satisfying the threshold value, and the alternative representation.

5. A computer-implemented method comprising:
receiving input data representing a natural language user input;
determining a first portion of the input data is able to be used to identify a user associated with the natural language user input;
generating an indicator representing the input data is able to be used to identify the user;
determining output data responsive to the input data;
sending the output data to a device; and
based on the indicator, causing deletion of the input data from a storage.

6. The computer-implemented method of claim 5, further comprising:
receiving stored data that is able to be used to identify the user;
processing the first portion with respect to the stored data;
determining that the first portion is semantically similar to the stored data; and
determining the first portion is able to be used to identify the user based on determining that the first portion is semantically similar to the stored data.

7. The computer-implemented method of claim 6, further comprising:
determining an entity type represented in second portion of the input data;
determining that the entity type is able to be used to identify the user;
determining, based on the entity type, the second portion is able to be used to identify the user; and
generating the indicator based on determining the first portion and the second portion is able to be used to identify the user.

8. The computer-implemented method of claim 7, further comprising:
determining a first value corresponding to a likelihood that the first portion is able to be used to identify the user;
determining a second value corresponding to a likelihood that the input data is able to be used to identify the user;
determining a ranked list based on the first value and the second value; and
determining the indicator based on the ranked list.

9. The computer-implemented method of claim 5, further comprising:
receiving stored data representing past natural language user inputs;
determining, using the stored data, a first past natural language user input semantically similar to the input data;
determining a number of times the first past natural language user input is received; and
determining the input data is able to be used to identify the user based on the number of times.

10. The computer-implemented method of claim 5, further comprising:
  receiving stored data that is able to be used to identify the user;
  determining that the first portion is semantically similar to at least the stored data; and
  determining the input data is able to be used to identify the user based on determining that the first portion is semantically similar to the stored data.

11. The computer-implemented method of claim 5, further comprising:
  processing the input data using a trained model configured to identify data that is able to be used to identify the user in the input data;
  determining a second portion of the input data is able to be used to identify the user; and
  determining the indicator based at least in part on determining the first portion and the second portion is able to be used to identify the user.

12. A system comprising:
  at least one processor; and
  at least one memory including instructions that, when executed by the at least one processor, cause the system to:
    receive input data representing a natural language user input;
    determine a first portion of the input data is able to be used to identify a user associated with the natural language user input;
    generate an indicator representing the input data is able to be used to identify the user;
    determine output data responsive to the input data;
    send the output data to a device; and
    based on the indicator, cause deletion of the input data from a storage.

13. The system of claim 12, wherein the instructions that, when executed by the at least one processor, further cause the system to:
  receive stored data that is able to be used to identify the user;
  process the first portion with respect to the stored data;
  determine that the first portion is semantically similar to the stored data; and
  determine the first portion is able to be used to identify the user based on determining that the first portion is semantically similar to the stored data.

14. The system of claim 13, wherein the instructions that, when executed by the at least one processor, further cause the system to:
  determine an entity type represented in second portion of the input data;
  determine that the entity type is able to be used to identify the user;
  based on the entity type, determine the second portion is able to be used to identify the user; and
  generate the indicator based on determining the first portion and the second portion is able to be used to identify the user.

15. The system of claim 14, wherein the instructions that, when executed by the at least one processor, further cause the system to:
  determine a first value corresponding to a likelihood that the first portion is able to be used to identify the user;
  determine a second value corresponding to a likelihood that the input data is able to be used to identify the user;
  determine a ranked list based on the first value and the second value; and
  determine the indicator based on the ranked list.

16. The system of claim 12, wherein the instructions that, when executed by the at least one processor, further cause the system to:
  receive stored data representing past natural language user inputs;
  determine, using the stored data, a first past natural language user input semantically similar to the input data;
  determine a number of times the first past natural language user input is received; and
  determine the input data is able to be used to identify the user based on the number of times.

17. The system of claim 12, wherein the instructions that, when executed by the at least one processor, further cause the system to:
  receive stored data that is able to be used to identify the user;
  determine that the first portion is semantically similar to the stored data; and
  determine the input data is able to be used to identify the user based on determining that the first portion is semantically similar to the stored data.

18. The system of claim 12, wherein the instructions that, when executed by the at least one processor, further cause the system to:
  process the input data using a trained model configured to identify data that is able to be used to identify the user in the input data;
  determine a second portion of the input data is able to be used to identify the user; and
  determine the indicator based at least in part on determining the first portion and the second portion is able to be used to identify the user.

* * * * *